(12) United States Patent
Oswall et al.

(10) Patent No.: US 8,583,740 B2
(45) Date of Patent: Nov. 12, 2013

(54) ACTIONABLE QUARANTINE SUMMARY

(75) Inventors: Michael J. Oswall, Berkeley, CA (US); Dorion A. Carroll, Oakland, CA (US); Lisa M. Hoggatt, San Francisco, CA (US); Scott M. Petry, Palo Alto, CA (US); Fredric L. Cox, San Jose, CA (US); Peter K. Lund, San Francisco, CA (US); Michael D. Beeson, Round Rock, TX (US)

(73) Assignee: Google Inc., Mountain View, CA (US)

( * ) Notice: Subject to any disclaimer, the term of this patent is extended or adjusted under 35 U.S.C. 154(b) by 1169 days.

(21) Appl. No.: 10/908,016

(22) Filed: Apr. 25, 2005

(65) Prior Publication Data
US 2006/0242708 A1 Oct. 26, 2006

(51) Int. Cl.
*G06F 15/16* (2006.01)
(52) U.S. Cl.
USPC .......... 709/206; 709/204; 709/205; 709/244; 726/24
(58) Field of Classification Search
USPC .............................. 709/206, 204, 205; 726/24
See application file for complete search history.

(56) References Cited

U.S. PATENT DOCUMENTS

| | | | |
|---|---|---|---|
| 6,212,265 B1 * | 4/2001 | Duphorne | 379/142.15 |
| 6,400,810 B1 | 6/2002 | Skladman et al. | |
| 6,650,890 B1 * | 11/2003 | Irlam et al. | 455/412.1 |
| 6,654,787 B1 | 11/2003 | Aronson et al. | |
| 2002/0159575 A1 * | 10/2002 | Skladman et al. | 379/93.24 |
| 2003/0158905 A1 | 8/2003 | Petry et al. | |
| 2004/0236839 A1 * | 11/2004 | Wilson et al. | 709/207 |
| 2005/0210116 A1 * | 9/2005 | Samson | 709/207 |

\* cited by examiner

*Primary Examiner* — Jude Jean Gilles
*Assistant Examiner* — Jaren M Means
(74) *Attorney, Agent, or Firm* — Birch, Stewart, Kolasch & Birch, LLP (57) ABSTRACT

Disclosed herein are systems, methods and the like for the management of filtered messages and filtering settings. Embodiments use the interaction of a user and a notification message to execute commands/requests. In one aspect, a notification message is used to notify a computer user of filtered incoming electronic messages that are stored in a quarantine server and database. In one embodiment, the notification message comprises message data having information regarding incoming messages blocked from reaching the destination server and stored in the quarantine server and database. Also in this embodiment, the message includes user interface data selectable by the user to manage the handling of incoming messages. In addition, the message includes action logic associated with the user interface data and configured to execute the selections made by the user by sending commands from the user's computer to the quarantine server and database via a computer network.

36 Claims, 4 Drawing Sheets

ACTIONABLE QUARANTINE SUMMARY

TECHNICAL FIELD

Disclosed embodiments herein relate generally to the filtering of unwanted incoming electronic messages, and more particularly to the management of filtered messages, as well as the settings involved in determining which messages are filtered, using the interaction of a user and a notification message to execute management commands/requests.

BACKGROUND

The adoption of electronic mail (email) has occurred at an unprecedented pace, and now, among routine computer users, most have an email address. In fact, many have more than one email address, e.g., one for work and another for home, primarily because email offers unparalleled convenience of written communication. However, with the widespread adoption of email, a proliferation of junk or otherwise unwanted email, or "spam," has also occurred. Currently, of the hundreds of millions of email messages sent each day, about 30% of those messages may be expected to be unwanted email.

Many companies have developed in recent years to combat the problem of unwanted email by providing email filtering that attempts to identify and discard unwanted email. Early approaches to combating unwanted emails have involved software that resides on a destination email server. Unfortunately, such a solution does not scale well since, generally speaking, installing and maintaining email filtering software on email servers grows increasingly difficult as the number of email servers multiplies.

Other older systems for blocking spam or viruses include systems that populate decoy email addresses around the Internet, where the decoy email addresses act as spam collectors. Human editors then review the messages that come in, catalog them, and create a database of such junk-mail messages and their checksums. The created database is then promulgated to subscribers of the service, and each message received at the customer premises is checked against the virus/spam database. Unfortunately, such detection and monitoring of the Internet for new virus and spam messages is not in real time, and the customer premise email server must still receive all of the spurious emails and then analyze all the incoming emails to see whether there is a match in the database.

A more recent approach to blocking unwanted email involves the intercepting of incoming messages before they reach the destination server, and filtering out the unwanted messages. An example of such a system is found in U.S. Pat. No. 6,650,890, which is commonly assigned with the present disclosure and incorporated herein by reference in its entirety. Moreover, once incoming messages deemed unwanted have been intercepted and stored ("quarantined"), notification messages may be sent to the intended recipients informing them of the quarantined messages. Examples of such quarantine summary messages may be found in U.S. Pub. Application 2003/0158905, which is also commonly assigned with the present disclosure and incorporated herein by reference in its entirety. Once notified of quarantined messages, a user may then log onto a message center via a computer network, in order to manage the quarantined messages or even to manage personal settings for that particular user's email filtering needs. Since interception of unwanted electronic messages has proven to be highly efficient, improvements in the way quarantined messages are managed are also beneficial for overall efficient in the war against spam, viruses, and other unwanted messages.

SUMMARY

Disclosed herein are systems, methods and the like for the management of filtered messages, as well as the settings involved in determining which messages are filtered. The systems, methods, etc., use the interaction of a user and a notification message to execute management commands/requests. In one aspect, a notification message is disclosed. The notification message is used to notify a computer user of incoming electronic messages blocked from reaching a destination server associated with the user's computer and stored in a quarantine server and database separate from the destination server. In one embodiment, the notification message comprises message data having information regarding incoming messages blocked from reaching the destination server and stored in the quarantine server and database. Also in this embodiment, the message includes user interface data selectable by the user to manage the handling of incoming messages. In addition, the message includes action logic associated with the user interface data and configured to execute the selections made by the user by sending commands from the user's computer to the quarantine server and database via a computer network.

In another aspect, disclosed is a method of notifying a computer user of incoming electronic messages blocked from reaching a destination server associated with the user's computer and stored in a quarantine server and database separate from the destination server. In one embodiment, the method comprises providing message data to the user, where the message data has information regarding incoming messages blocked from reaching the destination server and stored in the quarantine server and database. The method also includes providing user interface data selectable by the user to manage the handling of incoming messages. In such an embodiment, the method also includes providing action logic associated with the user interface data and configured to execute the selections made by the user by sending commands from the user's computer to the quarantine server and database via a computer network.

In a further aspect, disclosed is a method of managing incoming electronic messages blocked from reaching a destination server associated with a user's computer and stored in a quarantine server and database separate from the destination server. In one embodiment of this aspect of the disclosed principles, the method includes viewing message data provided in a notification message to the user, where the message data has information regarding incoming messages blocked from reaching the destination server and stored in the quarantine server and database. In addition, the method includes selecting, by the user, user interface data provided in the notification message in order to manage the handling of incoming messages. The method further provides for sending commands from the user's computer to the quarantine server and database via a computer network in response to the selecting made by the user, where the commands are executing the user's selections.

In still another aspect, disclosed is a system for managing the quarantining of incoming electronic messages. In one embodiment, the system comprises an electronic message processing service configured to intercept messages sent from sending servers to destination servers, and to identify one or more of the messages as unwanted by a user. The system also comprises a quarantine server and database configured to receive and store the one or more messages identified as unwanted by the electronic message processing service, as well as a user profile database configured to store a user profile providing parameters to the processing service for intercepting the messages and providing parameters to the quarantine server and database for managing the one or more messages stored. Moreover, in such embodiments, the system includes a notification server associated with the quarantine server and database and with the user profile database, and configured to generate a notification message based on the one or more stored messages and to transmit the notification message to the user based on the parameters in the user profile. Such notification messages comprise message data having information regarding one or more stored messages, and user interface data selectable by the user to manage the handling of incoming messages. In addition, the notification messages also comprise action logic associated with the user interface data and configured to execute the selections made by the user by sending commands from the user's computer to the quarantine server and database or to the user profile database via a computer network.

In yet another aspect, a method for managing the quarantining of incoming electronic messages is also disclosed. In embodiment, such a method includes intercepting electronic messages sent from sending servers to destination servers, identifying one or more of the messages as unwanted by a user, and storing the one or more messages identified as unwanted. In addition, the method includes generating a notification message having information regarding handling incoming messages, and transmitting the notification message to the user. Also in such embodiments, the method includes viewing message data provided in the notification message, where the message data has information regarding the stored one or more identified messages, and selecting, by the user, user interface data provided in the notification message in order to manage the handling of incoming messages. The method also includes sending commands from the user's computer via a computer network in response to the selecting made by the user, where the commands are executing the user's selections.

BRIEF DESCRIPTION OF THE DRAWINGS

For a more complete understanding of this disclosure, and the advantages of the systems and methods herein, reference is now made to the following descriptions taken in conjunction with the accompanying drawings, in which.

DESCRIPTION OF THE EMBODIMENTS

Figure 1:
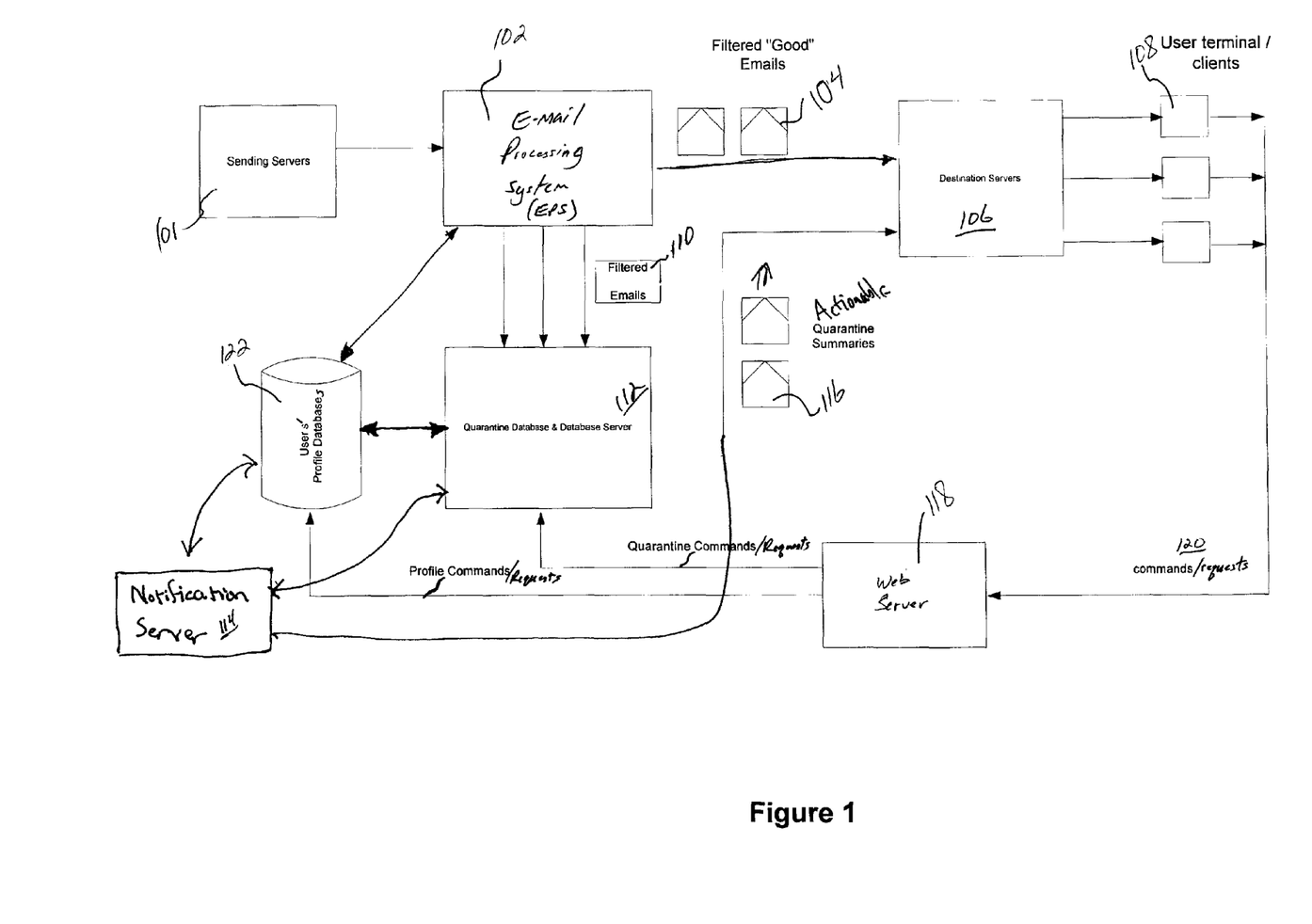
FIG. 1 illustrates one embodiment of an electronic message system having actionable quarantine capabilities in accordance with the disclosed principles.
Figures 2A, 2B:
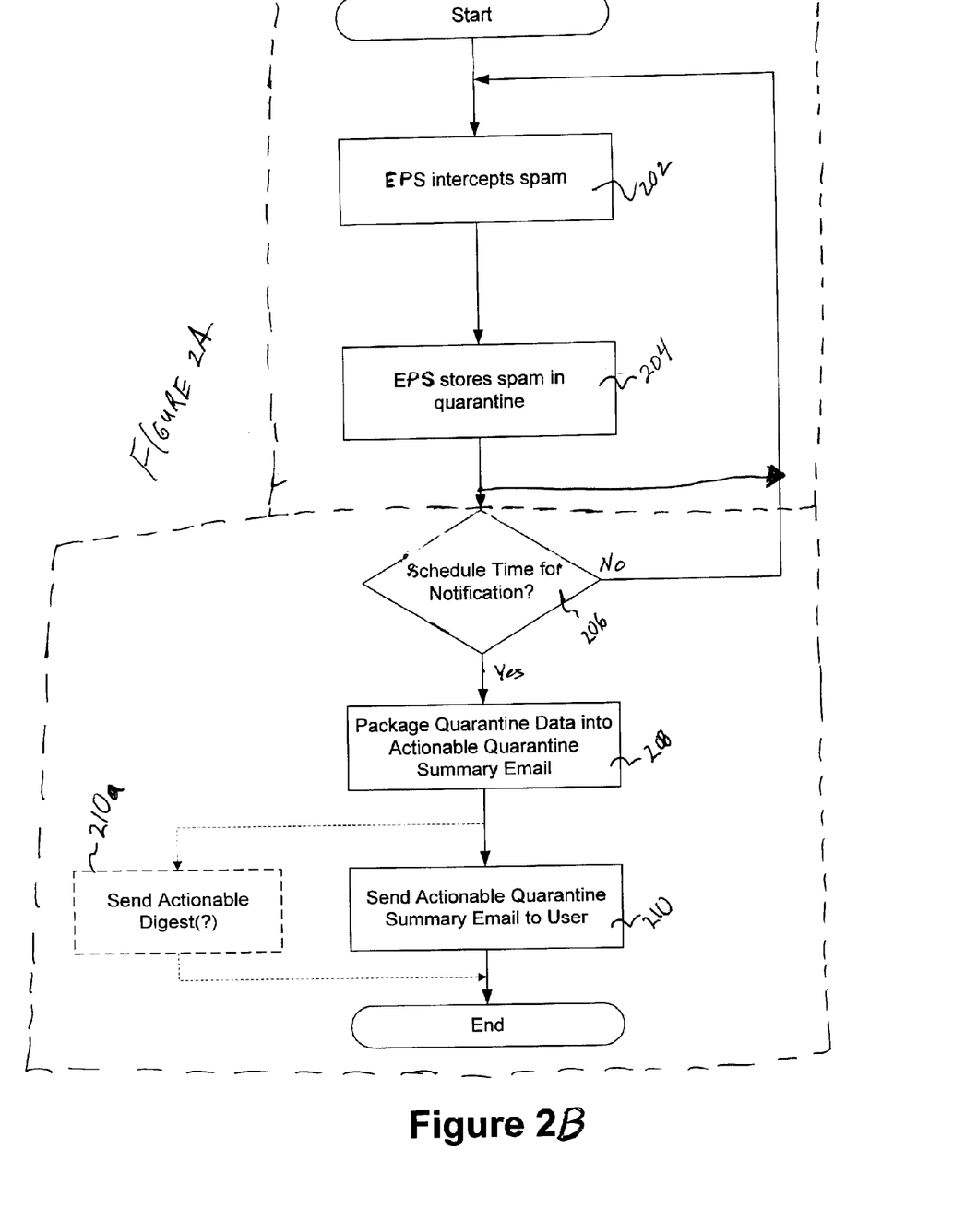
FIGS. 2A and 2B illustrate a flow diagram demonstrating the quarantining of electronic messages, and notifying the user of the quarantined messages, in accordance with the disclosed principles.

Referring initially to FIG. 1, illustrated is one embodiment of an electronic message system having actionable quarantine capabilities in accordance with the disclosed principles. In addition, reference is concurrently made to FIGS. 2A and 2B along with FIG. 1. FIGS. 2A and 2B illustrate parts of a flow diagram demonstrating the quarantining of electronic messages in accordance with the disclosed principles. Specifically, FIG. 2A illustrates the filtering of intercepted electronic messages to generate quarantined messages, while FIG. 2B illustrates notifying a user about quarantined messages. While the embodiments and examples disclosed and described herein are discussed in terms of "e-mails", it should be understood that the disclosed principles may be employed with any type of digital or electronic message sent from a source address to a destination address.

As shown in FIG. 1, the system includes sending servers 101, which by their name are employed to send electronic messages (e.g., e-mails) to specified destination addresses. Messages sent by the sending servers 101 may then be intercepted by an electronic message processing system (EPS) 102. The intercepting of the electronic messages is illustrated in Block 202 in FIG. 2A. As used herein, the term EPS 102 is a generic term used to include any type of message processing system that is capable of distinguishing between messages that are wanted and unwanted by the intended recipient. Specific examples of such an EPS 102 are disclosed in U.S. Pat. No. 6,650,890 and U.S. Published Patent Application No. 2003/0158905, both of which are incorporated herein by reference in their entirety. Of course, although these disclosures describe unique and specific message processing systems, it should be understood that the present disclosure is not limited to any particular processing system, and that any processing system, either now existing or later developed, may be employed with the disclosed principles.

As the EPS 102 operates to filter wanted and unwanted electronic messages, filtered "good" messages 104 are sent on by the EPS 102 to destination servers 106, which in turn deliver the good messages 104 to users associated with client terminals 108 connected to the destination servers 106. However, "bad" messages (e.g., spam, viruses, etc.) 110 are filtered by the EPS 102 and, as illustrated, are sent to a quarantine database & database server 112. The sending of 'spam' or otherwise unwanted messages 110 to the quarantine database 112 is also illustrated in Block 204 of FIG. 2A. Specifically, as shown in FIG. 2A, the system is configurable to cycle back to filter more intercepted messages and find and filter more unwanted messages that are then sent to the quarantine database, while allowing other messages be delivered to the destination servers 106, and thus to the client terminals 108.

Moreover, the filtering of intercepted messages may be configured to occur at any desired interval, or may simply be continuous. In addition, although several embodiments described herein refer to the filtering of unwanted messages (e.g., spam, blocked senders, explicit messages, viruses, etc.) from wanted messages, the disclosed principles are equally employable when other bases for filtering incoming messages is chosen. For example, multiple incoming messages, all of which are wanted by the user, may also be filtered and managed using the disclosed principles. Such embodiments are described in greater detail below.

Also included in the system of FIG. 1 is a notification server 114. While quarantined messages are typically continuously accumulating in the quarantine database 112, the user(s) of the system is notified about the quarantined messages at a specific time or a specific interval of time. More specifically, the notification server 114 is connected to the quarantine database 112 and configured to receive information regarding the quarantined messages to be delivered to the user(s). As shown in FIG. 1, the notification server 114 is also coupled to the destination servers 106, and this is the path the notification server 114 uses to deliver "actionable quarantine summaries" 116 to the user(s). Whether the notification server 114 is to send a user notification of the quarantined messages is typically established by each user. For example, the user may employ their client terminal 108 to send commands/requests 120 to the notification server 114 via a network server 118 by simply interacting with information provided in the quarantine summary message 116. The network server 118 may be a web server 118 on the Internet, and employable by the client terminals 108 to send commands 120 (e.g., HTTP requests 120) to the notification server 114 to establish a notification schedule. The process of sending such commands 120 using user interaction with the quarantine summary message 116 is discussed in further detail below.

Within FIG. 2B, Block 206 provides the condition of whether an actionable quarantine summary message 116 will be sent to the user(s). Specifically, as messages are being stored in the quarantine database 112, the system checks to see if it is time to send a notification. This may be done through interaction of the quarantine database 112 and the notification server 114 or by other appropriate means. If the condition is not met, meaning it is not time to send an actionable quarantine summary to the user(s), then no such summary is sent. If it is time to send a summary message, and thus preset conditions are met, the notification server 114 first packs the quarantine data into an actionable quarantine summary electronic message 116, as illustrated in Block 208 of FIG. 2B. At Block 210, the notification server 114 sends the actionable quarantine summary message 116 to the user(s), in this example as an e-mail message, via the destination server 106 and eventually to his client terminal 108.

The schedule for sending a summary can be set to anything each particular user desires. For example, a condition may be set for a notification to be sent at the same time each day, or perhaps each week. Alternatively, the condition may be set so that a notification summary is sent on a periodic basis, such as every 4 hours, every 8 hours, or even every 12 hours. Of course, any schedule for notification via an actionable quarantine summary 116 may be set, either by the user(s) or even by an administrator if desired.

Conditions for sending a quarantine summary message 116 to a user are stored in a user profile database 122. The user profile database 122 is connected to the notification server 114, as well as being connected to the quarantine database and database server 112 and the EPS 102, in order to provide preset parameters for establishing if and when action is taken by any of these components in the system. In a typical embodiment, a quarantine summary 116 would be sent to the user from the notification server 114 via the destination server 104. The notification server 114 would determine when the quarantine summary 116 should be sent, as well as the format, structure and contents of the quarantine summary 116. Such parameters may be retrieved by the notification server 114 from a user's profile stored in the user profile database 122. In addition, the message data to be included in the quarantine summary message 116 is also retrieved by the notification server 114, this time from the quarantine database 112. Once the quarantine summary 116 reaches the user, the user views the quarantine summary 116 on his client terminal 108, and can execute desired actions regarding his notification, his quarantined messages, his stored profile, or other information directly through interaction with the quarantine summary message 116 itself.

The format, structure and contents of the quarantine summary 116, as well as how the user interacts with the contents of the quarantine summary 116, are discussed in greater detail below with reference to FIG. 3. In addition, Block 210 of FIG. 2 includes the step of sending the actionable quarantine summary message 116 to the user, as discussed above. In other embodiments, at Block 210*a*, message digests may be sent in addition to or in place of the actionable quarantine summary message 116 sent to the user. More specifically, a message digest may include specific information about messages held in quarantine for the user, and this information may help the user make decisions regarding the management of quarantined messages without having to receive the entire message for review. For example, while an actionable quarantine summary message may simply provide identifying information about quarantined messages, such as the sender, message subject, and time received, a message digest may be constructed by the system to provide the user more detailed information. The contents of a message digest may include, for example, more detailed information about senders, summaries or portions of content/body of quarantined messages, whether viruses were detected in quarantined messages, and even grouping of messages by certain factors, such as by sender, content or date received. Rather than being a separate message sent to the user, such message digests may also be standard content for all actionable quarantine summary messages, if desired.

Actions taken by the user via the quarantine summary 116 are sent as commands or requests 120 sent, for example, to the quarantine database/server 112 or the user profile database 122, through the web server 118 the user's client terminal 108 is connected to. Such input can include whether to deliver a message identified in the quarantine summary 116 to the user's terminal 108, whether to delete a message held for the user in the quarantine database 112, changing the format or presentation of the data found in the quarantine summary 116, and even altering the user's profile stored in the profile database 122. Altering the user's profile may be done to establish any number of parameters, including when a notification of quarantined messages by quarantine summary 116 is sent, and the arrangement of quarantined messages stored in the quarantine database 112. In short, the disclosed principles allow a user to manage all facets of handling incoming messages, including the notification of unwanted or otherwise quarantined messages via commands and requests, without necessarily having the actual messages delivered to the user (unless desired). This allows both user profile and message management by the user using only direct interaction with the quarantine summary message 116 (hence, the quarantine message being "actionable"), without the need to "log on" or otherwise connect to a host site for carrying out these desired actions.

Figure 3:
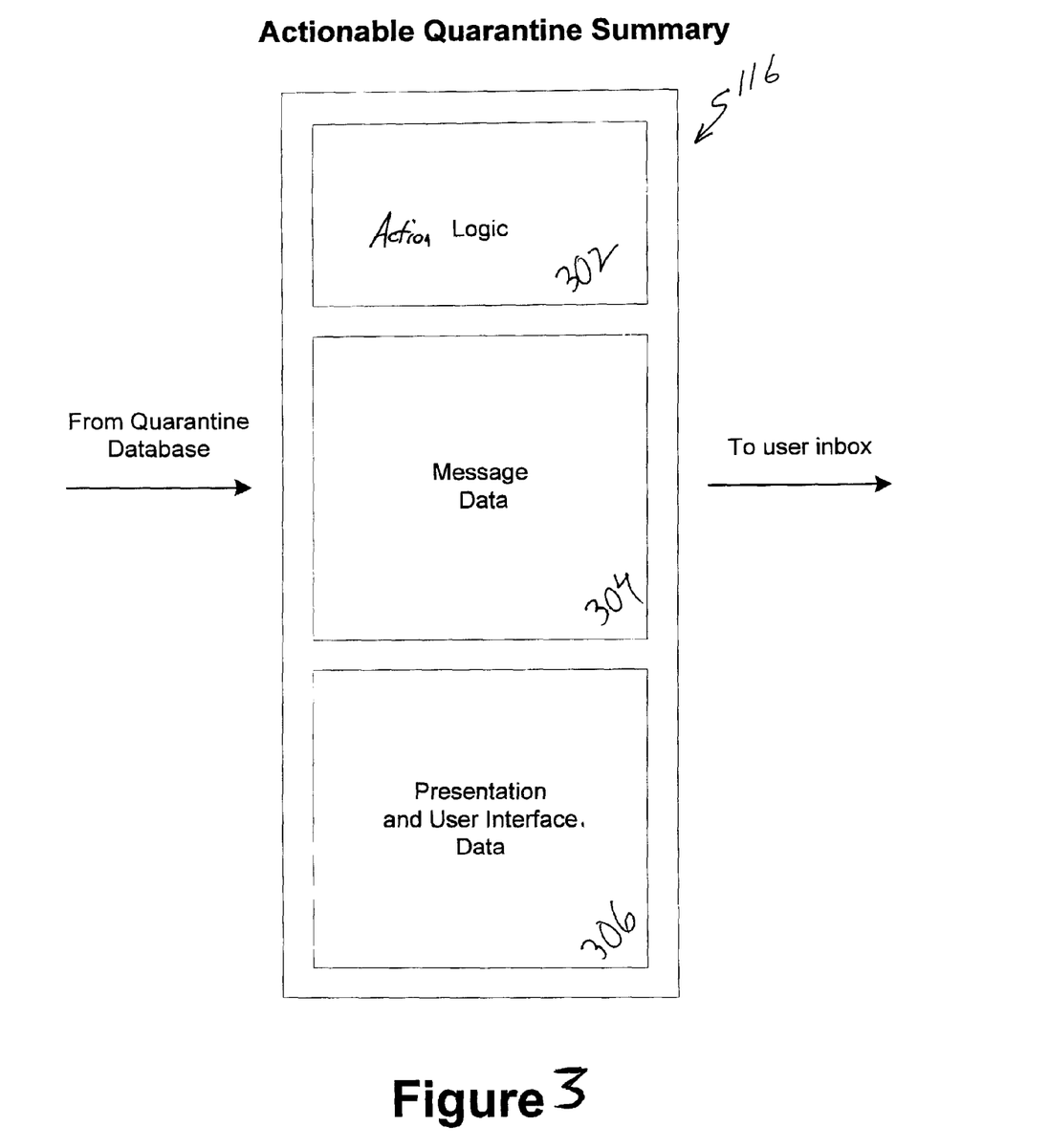
FIG. 3 illustrates a block diagram of one embodiment of an actionable quarantine summary message, such as the quarantine summary message discussed with reference to FIG. 1.

FIG. 3 illustrates a block diagram of one embodiment of an actionable quarantine summary message 116, such as the quarantine summary message 116 discussed with reference to FIG. 1. As shown, the quarantine summary 116 includes at least three areas: action logic 302, message data 304, and presentation and user interface data 306. The action logic 302 is embodied as embedded software or data that may be activated (or otherwise interacted with) by a user via his client terminal 108, in the manner discussed above.

However, although the quarantine summary 116 was received by the user from the notification server 114 via the destination server 106, commands or requests created by the user's interaction and activation of the action logic 302 are sent via the web server 118. Examples of action logic 302 that may be embedded in a quarantine summary 116 and actionable by a user include Java logic, Java script logic, HTML logic, HTTP logic, and cascading style sheets such as Windows®-based ActiveX. In fact, the action logic 302 may be any type of logic that may be actionable by a user, regardless of the software, hardware, or firmware associated with the user's client terminal 108, such that the quarantine summaries 116 having such action logic 302 are compatible with all systems, formats and protocols.

The message data 304 included in the quarantine summary 116 may include message content, message header information, message subject information, types of attachments with the message, priority status of the message, and the like. In some embodiments, to prevent spammers or other senders of unwanted messages from being able to include unwanted or perhaps even nefarious messages (e.g., viruses, spyware, etc.) in the message data 304 of the quarantine summary 116, the action logic 302 may also be configured with a digital signature or other type of encryption or security means. In such embodiments, authentication of the user is required before the action logic 302 accepts input from the user and sends such input back into the system via the web server 118. Other embodiments include pre-authentications provided in the quarantine summary message 116 sent by the notification server 114, which can allow the system to determine whether commands/requests sent by a user via the web server 118 were created by the notification server 114 or other part of the system. Employing any such security device could prevent spammers and the like from embedding their data in the message data 304 of the quarantine summary 116, and then an action of the user with the action logic 302 releasing or otherwise triggering that embedded data.

FIG. 3 also illustrates the presentation and user interface data 306 provided in the quarantine summary 116. Presentation data typically includes the formats that define the arrangement and presentation of the message data within the quarantine summary 116 as seen by the user. For example, this data 306 may include XML and HTML data that establishes how the message data is viewed by the user, as well as how the user interface data is displayed to the user in the summary message 116. Such presentation may include the content of the message data for viewing by the user, as well as columns setting forth information about the message data, such as file size and date received. User interface data includes data for arranging and displaying options for the user to interact with in order to manage the quarantined messages, as well as other settings such as those found in his personal user profile.

As with the message data 304, the user may interact with the presentation and user interface data 306 via the quarantine summary 116 to alter or otherwise modify settings for this data. As before, commands or requests 120 regarding the presentation and user interface data 306 are also sent to the user profile database 122 via the web server 118. Moreover, the quarantine summary message 116 may be further customized based on the specific user it reaches, as well as the location of that user. For example, the quarantine summary message 116 may be different depending on the geographic location of the user it is sent to. In such embodiments, for example, the quarantine summary message 116 may be language-specific to the location of the user or even based on the individual preferences of each user. Additionally, the laws of the location or jurisdiction where the quarantine summary message 116 is sent may also help tailor the contents of the quarantine summary message 116. For example, certain jurisdictions may require minimum disclaimers or disclosures in the quarantine summary message 116, while other jurisdictions may not. Thus, the format and content of the quarantine summary messages 116 may be customized using any desired parameters, including the user's personal selection or the laws or customs of the geographic location of individual users who receive the quarantine summary messages 116. The geographic location of the specific user can in many cases e assigned according to the location o the users' respective receiving e-mail servers.

Figure 4:
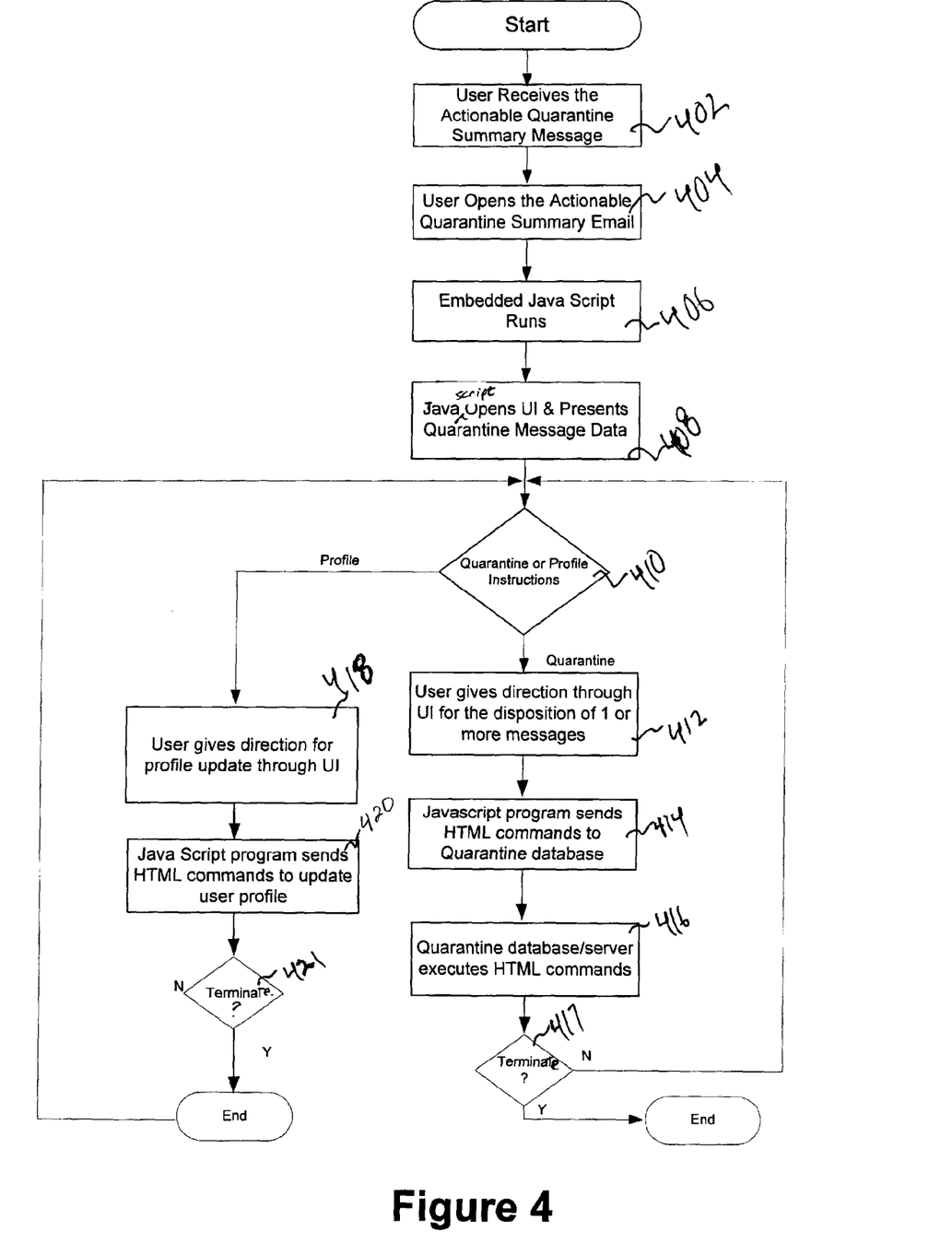
FIG. 4 illustrates a flow diagram of one embodiment of the interaction between a user and a received actionable quarantine summary message.

Turning now to FIG. 4, illustrated is a flow diagram of one embodiment of the interaction between a user and an actionable quarantine summary message he has received. The flow diagram illustrates how the user is able to manage quarantined messages, as well as his user profile settings or other settings used in handling incoming messages, by interacting with only data presented in the quarantine summary message. The illustrated process begins at a Block 402 where the user receives the actionable quarantine summary message through his normal e-mail inbox. At Block 404, after noticing the summary message has arrived, the user opens the message to display the contents.

In one embodiment, at Block 406, the user takes action with data he views in the quarantine summary message. Specifically, the user may click on an embedded Java script within the message, which causes the embedded Java script to run. At Block 408, when the Java script is executed by the user, the Java script in this embodiment opens a user interface (UI) and presents the message data to the user. In other embodiments, however, the user need not interact with data presented to him in the quarantine summary message, and therefore his review of the message may simply be limited to a viewing of the contents presented to him without changing or otherwise interacting with that content. In still other embodiments, the data embedded in the quarantine summary message for use by the user in accordance with the principles disclosed herein is not necessarily Java script, but rather may be another type of data such as HTML logic, HTTP logic, ActiveX, or other appropriate code or combination of codes. Consequently, the process of managing messages and settings described with reference to FIG. 4 may have a greater or lesser number of steps than described herein.

At Block 410, if the user has taken action via the Java script in the quarantine summary, it is determined whether the command/request by the user is for managing messages or his user profile. If the user action via the quarantine summary message is for managing messages (e.g., incoming or already quarantined messages), the user may give direction through the user interface at Block 412 to, for example, establish the disposition of one or more messages. The selected disposition may include deleting the message(s) from the quarantine database or perhaps delivering the message(s) to the user's electronic message inbox for his review. Once the user makes his selection using the user interface, at Block 414 the Java script program sends the command/request to the quarantine database to execute the user's chosen action. As mentioned above, the command/request is sent to the quarantine database from the user terminal through the web server the user's terminal is connected to. Other management action may be to alter the parameters used by the processing service to filter unwanted messages, in which case the command/request is sent to the user profile database, which provides filtering parameters for the processing service.

In this embodiment, the command/request is an HTML command/request, such as embedded links the user clicks with a computer mouse, however, as noted above the format of the command/request may be any desired format, either now existing or later developed. Moreover, in other embodiments, for example if the user is simply selecting quarantined messages for deletion from the quarantine database, there may be no embedded Java script (or other format) program in the quarantine summary message. In such embodiments, the summary message may be configured to send the user's command/request to delete one or more messages as a result of the user selecting this action (e.g., clicking) and without executing an embedded program or other type of distinct user interface. Other message handling or management that may be accomplished by a user via an actionable quarantine summary message include ignoring the message, moving the message into a designated folder, delivering the message to user's inbox, viewing a message (e.g., through a web page), adding a sender of a message to a blocked sender list, adding a sender of a message to an approved sender list, or delivering the message to another destination designated by the user.

When the quarantine database and database server receives the command/request, the database/server executes the command/request at Block 416. At Block 417, it is determined whether there are any further commands/requests to be executed, as directed by the user. Specifically, if the user no longer chooses to manage any more messages, parameters, or other settings via the active logic (in this embodiment, the Java script program activated by the user), the active logic is terminated, and the process ends. However, if the user is not yet finished employing the active logic, the active logic will not terminate and the process returns to Block 410, where it is again determined whether the action taken by the user involves message handling or management of the user's profile in the system, or any other available action.

If the action taken by the user involves the management of his user profile, then from Block 410 the process moves to Block 418. Here, the user interacts with the user interface (or perhaps simply clicks on links in the quarantine summary message) to give direction to the system for a user profile update. Once the user takes his desired action, at Block 420 the Java script program sends the command/request to the user profile database to execute the user's chosen action. In this portion of the process, the command/request for updating the profile is sent to the user profile database from the user terminal and again through the web server the user's terminal is connected to. The action selected by the user is then executed in the user profile database to update the profile. At Block 421, it is determined whether there are any further commands/requests to be executed, as directed by the user. Specifically, if the user has no further updates to his user profile, the active logic is terminated and the process ends. However, if the user is not yet finished using the active logic either for the user profile database, the quarantine database, etc., the active logic will not terminate and the process returns to Block 410. If the process returns to Block 410, it is again determined whether the further action taken by the user involves message handling or management of the user's profile in the system.

While the above description has focused on filtering between unwanted messages (e.g., spam, blocked senders, explicit messages, viruses, etc.) and wanted messages, as mentioned above the disclosed principles are equally employable when filtering or otherwise separating wanted incoming messages from each other. For example, in some embodiments incoming electronic messages may be filtered so as to separate personal from professional messages. In such embodiments, the personal messages may be quarantined in the quarantine database, and then later retrieved or otherwise disposed of via an actionable quarantine summary message sent to the user at the predetermined time. In this example, all incoming personal electronic messages may be filtered and stored in the quarantine database, and the user notified of the personal messages stored in the quarantine database. The user may then take action or otherwise manage the quarantined personal messages through the quarantine summary message he receives at the preset time. It should be noted that unwanted messages may also continue to be filtered from among the incoming messages, in addition to the personal messages, and the quarantine summary message arranged to display which messages are which.

Furthermore, in other embodiments of the disclosed principles, separation of intercepted messages may also occur within the quarantine database and database server. For example, the quarantine database may include multiple folders for separating intercepted messages on any predetermined bases. In some embodiments, messages may be stored in separate folders within the quarantine database based on message content (e.g., detecting the presence of explicit content versus determining that the message is an advertisement), while in other embodiments, the separation may be based on the senders of the messages or other potential categories. Moreover, an administrator may be employed to provide the separation of intercepted messages into such distinct folders within the quarantine database, but this is not required. In all such embodiments, the actionable quarantine summary message sent to the user can include the categorization of the intercepted messages in the message data presented to the user. As a result, not only can the user delete or mark a message for delivery to his inbox, he can also manage messages among his several folders on the quarantine database simply through interaction with the actionable quarantine summary message, and without the need to separately log on to a webpage or other interface for managing the handling of messages. In addition, the user may change the settings for the folders maintained on the quarantine database using the action logic in the actionable quarantine summary message and following the principles disclosed herein.

While various embodiments of actionable quarantine summary systems and methods according to the principles disclosed have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method of notifying a computer user of incoming electronic messages sent to a recipient address of the user but are blocked from reaching a destination electronic message server associated with the user's computer using a central message processing system and stored in a quarantine server and database separate from the destination electronic message server, the method comprising:

sending a notification e-mail message by the central message processing system to an e-mail address of the user, the notification e-mail message having information regarding incoming messages blocked from reaching the destination electronic message server, wherein the information is viewable within the notification e-mail message and comprises portions of a message body associated with one or more of the blocked incoming messages, wherein the incoming messages are stored in the quarantine server and database by the central message processing system, the notification e-mail message comprising user interface data and action logic to manage the handling of the stored incoming messages, wherein the action logic is configurable to execute selections made by the user to manage the handling of the stored incoming messages without having to log-on to a webpage; and     further comprising providing presentation data associated with the user interface data for arranging and displaying options associated with the user interface data within the notification e-mail message.

2. A method according to claim 1, the presentation data further operable for determining the arranging and displaying of the message data within the notification message.

3. A method according to claim 1, wherein the action logic comprises embedding executable code in the notification message.

4. A method according to claim 3, wherein the executable code is selected from the group consisting of Java, Java scripts, HTML logic, HTTP logic, and Active X.

5. A method according to claim 1, wherein providing user interface data to manage the handling of incoming messages comprises providing user interface data further selectable by the user to manage settings of a user profile associated with the user, whereby incoming messages are blocked and stored in accordance with the settings in the user profile.

6. A method according to claim 5, wherein the notifying occurs in accordance with the settings in the user profile.

7. A method according to claim 1, wherein the message data comprises message content, message header information, message subject information, types of attachments with the message or priority status of the message.

8. A method according to claim 1, wherein the executed selection comprises one or more HTML commands.

9. A method according to claim 1, wherein providing user interface data selectable by the user to manage the handling of incoming messages further comprises providing user interface data further selectable by the user to manage the deletion of messages stored in the quarantine database, ignoring messages, moving messages into a designated folder, delivering message to user's inbox, viewing a message, adding a sender of a message to a blocked sender list, adding a sender of a message to an approved sender list, or delivering messages to other destinations designated by the user.

10. A method of managing incoming electronic messages sent to a recipient address of the user but are blocked from reaching a destination electronic message server associated with a user's computer using a central message processing system and stored in a quarantine server and database separate from the destination electronic message server, the method comprising:

providing message data provided in a notification e-mail message sent to the recipient address of the user, the notification e-mail message having information regarding incoming messages blocked from reaching the destination electronic message server and stored in the quarantine server and database by the central message processing system, wherein the information is viewable within the notification e-mail message and comprises portions of a message body associated with one or more of the blocked incoming messages;

receiving, at the central message processing system, data associated with one or more selections from a user interface provided in the notification e-mail message for managing the handling of incoming messages, the notification e-mail message comprising action logic configurable to execute the selections made by the user to manage the handling of the stored incoming messages without having to log-on to a webpage; and     further comprising providing presentation data associated with the user interface data for arranging and displaying options associated with the user interface data within the notification e-mail message.

11. A method according to claim 10, the presentation data further operable for determining the arranging and displaying of the message data within the notification message.

12. A method according to claim 10, wherein the method further comprises sending commands to the quarantine server and database using executable code embedded in the notification message.

13. A method according to claim 12, wherein the executable code is selected from the group consisting of Java, Java scripts, HTML logic, HTTP logic, and Active X.

14. A method according to claim 10, wherein selecting user interface data to manage the handling of incoming messages further comprises selecting user interface data in order to manage settings of a user profile associated with the user, whereby incoming messages are blocked and stored in accordance with the settings in the user profile.

15. A method according to claim 14, wherein the notifying occurs in accordance with the settings in the user profile.

16. A method according to claim 10, wherein the message data comprises message content, message header information, message subject information, types of attachments with the message or priority status of the message.

17. A method according to claim 10, wherein the executed selection comprises one or more HTML commands.

18. A method according to claim 10, wherein selecting user interface data to manage the handling of incoming messages further comprises selecting user interface data in order to the delete messages stored in the quarantine database, ignore messages, move messages into a designated folder, deliver message to user's inbox, viewing a message, adding a sender of a message to a blocked sender list, adding a sender of a message to an approved sender list, or deliver messages to other destinations designated by the user.

19. A system for managing the quarantining of incoming electronic messages, the system comprising:

a centralized electronic message processing service installed and running on one or more computing devices connected to a communications network, the centralized electronic message processing service configured to intercept electronic messages sent to a recipient address of the user from sending electronic message servers via destination electronic message servers, and to identify one or more of the electronic messages as unwanted by a user;

a quarantine server and database installed on one or more computing devices in communication with the electronic message processing service and configured to receive and store the one or more electronic messages identified as unwanted by the electronic message processing service;

a user profile database installed on one or more computing devices in communication with the electronic message processing service and configured to store a user profile providing parameters to the processing service for intercepting the electronic messages and providing parameters to the quarantine server and database for managing the one or more electronic messages stored;

a notification message server installed on one or more computing devices in communication with the electronic message processing service, and associated with the quarantine server and database and with the user profile database, and configured to generate a notification e-mail message based on the one or more stored electronic messages and to transmit the notification e-mail message to the e-mail address of the user based on the parameters in the user profile, the notification e-mail message comprising:

message data having information regarding one or more stored electronic messages, wherein the information is viewable within the notification e-mail message and comprises portions of a message body associated with one or more of the blocked incoming messages;

a user interface and action logic to manage the handling of the stored incoming messages, wherein the action logic is configurable to execute selections made by the user to manage the handling of the stored incoming messages without having to log-on, to a webpage; and further comprising providing presentation data associated with the user interface data for arranging and displaying options associated with the user interface data within the notification e-mail message.

20. A system according to claim 19, the presentation data further operable for arranging and displaying of the message data within the notification message.

21. A system according to claim 20, wherein the action logic comprises executable code embedded in the notification message.

22. A system according to claim 21, wherein the executable code is selected from the group consisting of Java, Java scripts, HTML logic, HTTP logic, and Active X.

23. A system according to claim 19, wherein the user interlace data is further selectable to manage settings of a user profile associated with the user, whereby incoming messages are blocked and stored in accordance with the settings in the user profile.

24. A system according to claim 23, wherein the settings in the user profile include when the notification message is sent to the user.

25. A system according to claim 19, wherein the message data comprises message content, message header information, message subject information, types of attachments with the message or priority status of the message.

26. A system according to claim 19, wherein the executed selection comprises one or more HTML commands.

27. A system according to claim 19, wherein the user interface data being selectable to manage the handling of incoming messages comprises being selectable to manage the deletion of messages stored in the quarantine database, ignoring messages, moving messages into a designated folder, delivering message to user's inbox, viewing a message, adding a sender of a message to a blocked sender list, adding a sender of a message to an approved sender list, or delivering messages to other destinations designated by the user.

28. A method for managing the quarantining of incoming electronic messages the method comprising:

intercepting electronic messages sent to recipient addresses of users from sending electronic message servers via destination electronic message servers using a central message processing system;

identifying one or more of the electronic messages as unwanted by a user using the central message processing system;

storing the one or more electronic messages identified as unwanted;

generating a notification e-mail message by the central message processing system and having information regarding handling incoming electronic messages in the message body;

transmitting the notification e-mail message to the e-mail address of the user using the central message processing system;

providing message data, in the notification e-mail message, the message data having information regarding the stored one or more identified electronic messages, wherein the information is viewable within the notification e-mail message and comprises portions of a message body associated with one or more of the blocked incoming messages;

receiving, at the central message processing system data associated with one or more selections from a user interface provided in the notification e-mail message for managing the handling of incoming messages, the notification e-mail message comprising action logic configurable to execute the selections made by the user to manage the handling of the stored incoming messages without having to log-on to a webpage; and further comprising providing presentation data associated with the user interface data for arranging and displaying options associated with the user interface data within the notification e-mail message.

29. A method according to claim 28, the presentation data further operable for determining arranging and displaying of the message data within the notification message.

30. A method according to claim 28, wherein the executed selection comprises sending commands from the user's computer using executable code embedded in the notification message.

31. A method according to claim 30, wherein the executable code is selected from the group consisting of Java, Java scripts, HTML logic, HTTP logic, and Active X.

32. A method according to claim 28, wherein selecting user interface data further comprises selecting user interface data in order to manage settings of a user profile associated with the user, whereby incoming messages are blocked and stored in accordance with the settings in the user profile.

33. A method according to claim 32, wherein the generating a notification message occurs in accordance with the settings in the user profile.

34. A method according to claim 28, wherein the message data comprises message content, message header information, message subject information, types of attachments with the message or priority status of the message.

35. A method according to claim 28, wherein the executed selection comprises one or more HTML commands.

36. A method according to claim 28, wherein selecting user interface data message in order to manage the handling of incoming messages comprises selecting user interface data to manage the deletion of messages stored in the quarantine database, ignoring messages, moving messages into a designated folder, delivering message to user's inbox, viewing a message, adding a sender of a message to a blocked sender list, adding a sender of a message to an approved sender list, or delivering messages to other destinations designated by the user.

* * * * *